United States Patent [19]
Smith et al.

[11] 3,817,962
[45] June 18, 1974

[54] CONTROLLED POLYMERIZATION PROCESS AND APPARATUS

[75] Inventors: Dexter E. Smith; William S. Stewart, both of Bartlesville, Okla.

[73] Assignee: Phillips Petroleum Company, Bartlesville, Okla.

[22] Filed: Oct. 26, 1971

[21] Appl. No.: 192,290

[52] U.S. Cl. ..... 260/88.2 R, 260/80.78, 260/94.9 P
[51] Int. Cl. .................. C08f 15/04, C08f 15/40
[58] Field of Search ............ 260/88.2, 80.78, 94.9 P

[56] References Cited
UNITED STATES PATENTS

| | | | |
|---|---|---|---|
| 3,257,363 | 6/1966 | Miller | 260/88.2 |
| 3,523,929 | 8/1970 | Paige | 260/80.78 |
| 3,565,873 | 2/1971 | Sutherland | 260/80.78 |

OTHER PUBLICATIONS

Gaylord, Norman G. and Mark, Herman F. pp. 120–121, 1959, Linear and Stereoregular Addition Polymers, Interscience Publ, Inc., New York

*Primary Examiner*—Joseph L. Schofer
*Assistant Examiner*—A. Holler
*Attorney, Agent, or Firm*—Young and Quigg

[57] ABSTRACT

In a polymerization system having first and second feed streams, diluent and recycled diluent streams, and a modifier stream controllably fed to a reactor, a resultant product stream is passed from the reactor, and a gas stream is removed from the resultant bottoms product of the reactor. The gas stream is analyzed and signals are delivered in response to the analysis. The signals are modified and compared to a modified signal responsive to one of the flow rates of the recycled diluent stream of the second feed stream that has been modified by the flow rate of the diluent stream for providing a resultant control signal for relatively controlling the flow of the modifier stream.

6 Claims, 1 Drawing Figure

PATENTED JUN 18 1974
3,817,962
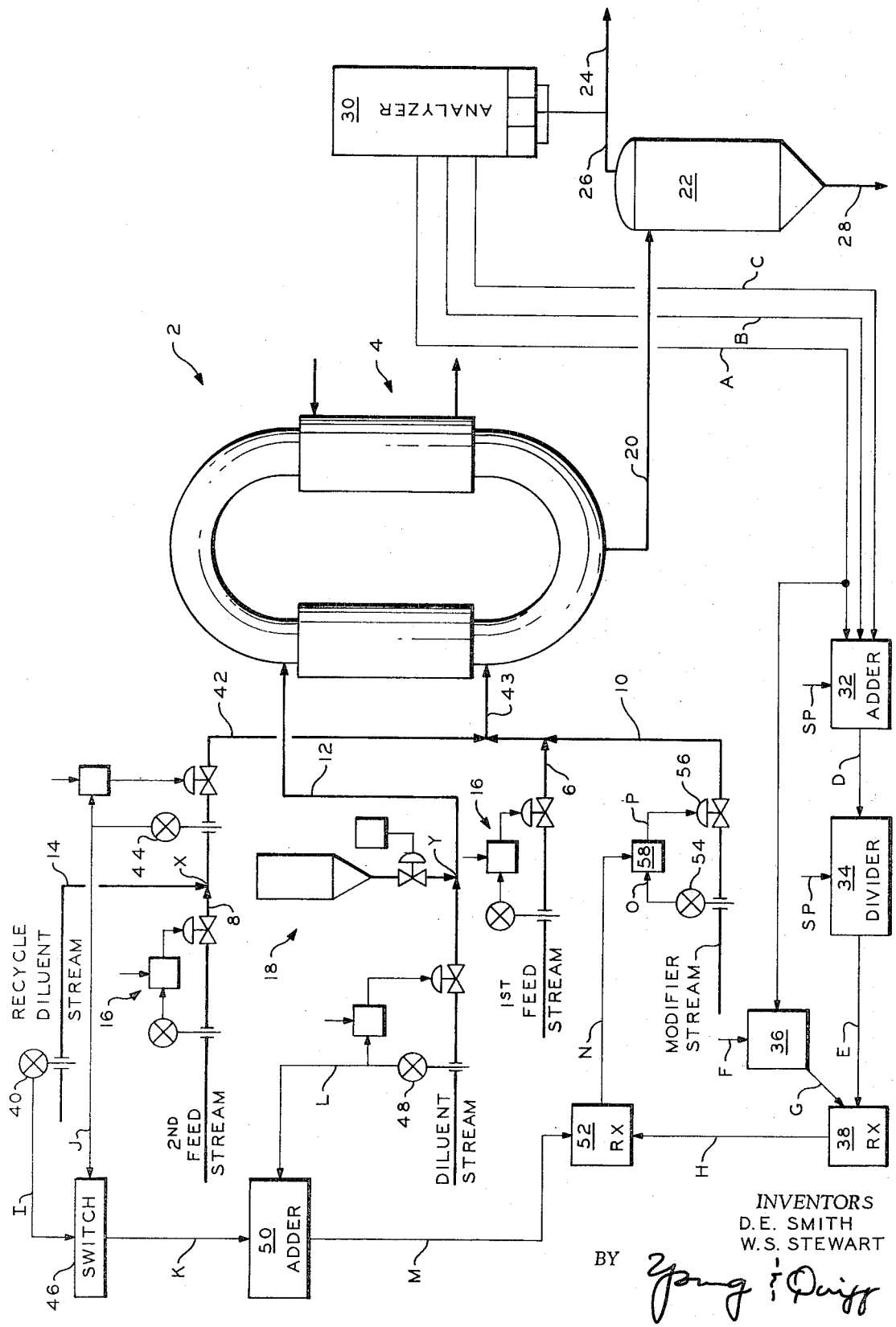
INVENTORS
D.E. SMITH
W.S. STEWART
BY Young & Quigg
ATTORNEYS

CONTROLLED POLYMERIZATION PROCESS AND APPARATUS

In a polymerization reaction system, it is often desirable to reduce the time lag between variations of one or more of the reactor feed streams and changes in the composition of the resultant product and to maintain a more uniform resultant product. The composition changes of the resultant product can often be minimized by controlling the rate of flow of the modifier stream in response to product analysis and flow rates of streams entering the reactor, thereby decreasing the disturbances in the reactor caused by varying flow rates. This is particularly true where the concentration of a monomer can vary significantly more rapidly than the concentration of the modifier stream.

In summary, this invention resides in improved control of the flow rate of one of the streams flowing into a reactor of the polymerization process system in response to analysis of a gas stream separated from the resultant product of the reactor and the flow rates of other streams flowing into the reactor.

The drawing is a diagrammatic view of an example polymerization system controlled by the process and apparatus of this invention.

Referring to the drawing, a reactor 2 has a heat exchanging means 4 associated therewith to control the reaction temperature therein as known in the art. First and second feed streams 6,8, for example an ethylene stream and a comonomer stream, are controllably passed via respective conduit into the reactor 2. A modifier stream 10 such as hydrogen, for example, a diluent stream 12 and a recycled diluent stream 14 such as isobutane, for example, are passed through the separate conduits into the reactor 2. Examples of the second feed stream 8 comonomer are hexene-1, or butene-1.

The first and second feed streams are controllably passed into the reactor at preselected rates. The controlling apparatus 16 such as a flow recorder controller can be associated with a computer or other means as known in the art for maintaining these flow rates at values relative to operating conditions of the system. Injection means 18, as known in the art, are associated with the system for controllably adding catalyst to the reactor 2 by, for example, injecting said catalyst into the diluent stream 12 at a location Y upstream of the reactor 2.

A discharge conduit 20 is connected at one end to the reactor and at the other end to a flash tank 22 for removing resultant product from the reactor and passing said product into the flash tank at which location an effluent gas stream 24 is separated therefrom. A line 26 is connected to an upper portion of the flash tank 22 for the passage of the effluent gas stream 24 from the flash tank 22 and line 28 is connected to a lower portion of the flash tank 22 for removing degasified product therefrom.

An analyzing-transmitting means 30 is associated with the gas stream for analyzing said stream. The analyzer can be for example a chromatographic analyzer having a plurality of chromatographic analyzing columns. The analyzing-transmitting means receives a portion of the gas stream 24, analyzes portions of the stream, and delivers a signal A responsive to the weight fraction of the modifier 10 in said effluent gas stream 24, a signal B responsive to the weight fraction of the first feed stream in said gas stream 24, and a signal C responsive to the weight fraction of the second feed stream in said gas stream 24.

A first adder 32 having a set point or bias of 1.00 is connected to the analyzer 30. It should be understood that the adder 32 can be a subtracting element and the use of the term is dependent upon whether you are considering negative or positive values. The first adder receives signals A, B, and C from the analyzer, subtracts signals A, B, and C from the set point 1.00 for example, and delivers a signal D responsive to said computation ($D$ = set point (1.00) $-A - B - C$). For convenience in signal modification and for keeping to a minimum the amount of control equipment utilized, it is preferred that the set point signal has a value of 1.00 relative to the weight fraction signals A, B, and C.

A divider 34 has a set point of 1.00 and is connected to the first adder for receiving the signal D, dividing the set point of the divider 34 by the signal D and delivering a computed signal E responsive to said division ($E = 1.00/D$). For the reasons set forth above with regard to the set point of the first adder, it is preferred that the set point of the divider 34 has a value of 1.00 relative to the weight fraction signals A, B, and C.

An analysis controller 36 has biasing set point F and is connected to the analyzing means 30 for receiving the signal A (weight fraction of hydrogen in stream 24), subtracting said set point signal F from said measured signal A and delivering an output signal G responsive to said subtraction.

The biasing set point F is a manually set signal representative of the desired hydrogen weight fraction concentration.

A first multiplier controller 38 is connected to the divider 34 and the analysis controller 36 for receiving the signals E and G, multiplying said signal G by said signal E, and delivering an output signal H in response to said multiplication. Said signal H is the feed ratio of hydrogen modifier to total diluent.

A first flow rate measuring-transmitting element 40 is associated with the recycled diluent stream 14 for measuring the flow rate of said stream 14 and delivering a signal I responsive to said measurement.

The recycled diluent stream 14 is connected with the second feed stream 8 at a location X upstream of the reactor 2 and downstream of the means for controlling the flow rate of said second stream for commingling said recycle diluent stream 14 and the second feed stream 8 and forming a first composite stream 42. The first composite stream 42 and the modifier stream 10 are connected with the first feed stream 6 at locations upstream of the reactor 2 for forming a second composite stream 43 flowing into the reactor 2.

A second flow rate measuring-transmitting element 44 is associated with the second feed stream 8 and diluent stream 14 at a location between said location X and the reactor 2 for measuring the flow rate of the first composite stream 42 and delivering a signal J responsive to said measurement.

A switch 46 such as a manually operated switch for example, preferably a mechanical switch, is connected to the first and second flow rate measuring-transmitting elements 40,44 for receiving the signals I and J therefrom and delivering a signal K. The signal K is a selected one of said signals I or J. This switch provides an operator the choice of controlling from the flow rates of the first composite stream 42 or the recycle diluent stream 14.

A third flow rate measuring-transmitting element 48 is associated with the diluent stream 12 at a location upstream of the location Y for measuring the flow rate of said diluent stream 12 and delivering a signal L in response to said measurement.

A second adder 50 is connected to the switch 46 and the third flow measuring-transmitting element 48 for receiving the signals K and L therefrom, adding signals K and L, and delivering a signal M in response to said addition.

A second multiplier controller 52 is connected to the output of second adder 50 and the output of the multiplier controller 38 for receiving and multiplying signals M and H, respectively, and delivering an output signal N in response to said multiplication.

A fourth flow rate measuring-transmitting element 54 is associated with the modifier stream 10 for measuring the flow rate of said stream and delivering a signal 0 in response to said measurement.

A control valve 56 is positioned in the modifier stream 10 for controlling the flow rate of said modifier stream 10 into the reactor 2. A flow rate controller 58 is connected to the output of the second multiplier controller 52 and the fourth flow measuring-transmitting element 54 for receiving signals N and O respectively, comparing said measured flow signal O with set point signal N and delivering a signal P to the control valve 56 for controlling the rate at which the modifier stream 10 is delivered into the reactor 2 ($P = O - N$).

In the process, a first feed stream 6 such as, for example, ethylene and a second feed stream 8, such as for example hexene-1, or butene-1 are controllably passed into the reactor 2. The recycle diluent stream 14 is delivered to the reactor and fresh diluent and catalyst are controllably added to the reactor 2.

Since the concentration of the first and second feed streams are often varied in concentration, as known in the art, the analyzing means 30 is utilized for detecting these changes in the gas stream 24 that is separated from the resultant product of the reactor 2. The analyzer delivers signals responsive to this analysis. These signals are modified, thereafter compared with a modified signal that is responsive to one of the flow rates of the recycle diluent stream 14 or the flow rate of the first composite stream 42 for delivering a set point signal N that is utilized for controlling the flow rate of the modifier stream 10 into the reactor 2.

By so controlling the reaction, a more uniform product results from early detection of variations in concentration of the streams flowing into the reactor and controlling the modifier stream to minimize the upset in the reactor caused by the varying concentrations. The switch 46 permits the operator selectivity in modifying the signal M.

The following is an example of the controlled polymerization process and apparatus where butene-1, hydrogen and ethylene are incoming streams to the reactor.

EXAMPLE

Stream 24 = effluent of flash tank 22
Signal A = .0010 weight fraction of modifier hydrogen in stream 24
Signal B = .05 weight fraction of first feed stream 6, ethylene, in stream 24
Signal C = .02 weight fraction of second feed stream 8, butene-1, in stream 24
Signal D = 1.0 − A − B − C = 0.929
Signal E = Set point of E/D = 1.0/0.929 = 1.076
Signal F = Biasing set point of controller 36 − .9176

Signal G = A − F = .001 − (− .9176) = 0.9186
Signal H = (E) (G) = (1.076) (0.9186) = 0.988 SCFM of $H_2$/1.0 gal/min diluent
Signal J = K = 20 gal/min first composite stream
Signal L = 2 gal/min diluent (isobutane)
Signal M = K + L = 20 + 2 = 22 gal/min diluent + second feed stream
Signal N = (M) (H) = (22) (.988) = 21.744 SCFM $H_2$ set point value for Signal O Other modifications and alterations of this invention will become apparent to those skilled in the art from the foregoing discussion and accompanying drawing, and it should be understood that this invention is not to be unduly limited thereto.

What is claimed is:

1. A method for controlling a modifier stream of a polymerization process wherein first and second monomer feed streams, a diluent stream, a recycle diluent stream, and the modifier stream are controllably passed into a temperature controlled reactor, a catalyst is controllably added to the diluent stream, a resultant product stream is removed from the reactor, and passed into a flash tank for the separation of a gas stream therefrom, comprising:

analyzing the separated gas stream and delivering a signal A responsive to the weight fraction of the modifier in said gas stream, a signal B responsive to the weight fraction of the first feed stream in the gas stream, and a signal C responsive to the weight fraction of the second feed stream in the gas stream;

receiving signals A, B, C, subtracting said signals from a set point and delivering a computed signal D representative of the total concentration of the modifier, first feed stream, and second feed stream in said gas stream;

receiving signal D, dividing a set point signal by said signal D, and delivering a signal E in response to said division;

subtracting a set point signal F from signal A and delivering a signal G responsive to said subtraction, said set point signal F being representative of a preselected hydrogen weight fraction concentration;

multiplying signals G and E and delivering a signal H in response to said multiplication;

measuring the flow rates of the total diluent passing to the reactor and delivering a signal M in response to said measurement;

multiplying signal H times signal M and delivering a signal N in response to said multiplication;

measuring the flow rate of the modifier stream and delivering a signal O responsive to said measurement; and controlling the flow rate of the modifier stream into the reactor in response to a comparison of signals N and O.

2. A method, as set forth in claim 1, wherein signal M is obtained by measuring the flow rate of the recycle diluent stream and delivering a signal K in response to said measurement;

measuring the flow rate of the diluent stream and delivering a signal L responsive to said flow rate;

adding signals K and L and delivering a signal M in response to said addition.

3. A method as set forth in claim 1, including analyzing the gas stream by passing said gas stream through a plurality of chromatographic analyzing columns.

4. A method, as set forth in claim 1, wherein the first feed stream is ethylene and the second feed stream is one of hexene-1 or butene-1.

5. A method, as set forth in claim 1, wherein said analyzing of gas stream is by chromatographically analyzing said gas stream, the first feed stream is ethylene, the second feed stream is one of hexene-1 or butene-1, the modifier stream is hydrogen, and the reactor is a polyolefin particle form type reactor, and including:

receiving signals A, B, and C, subtracting said signals from a set point having a value of 1, and delivering a signal D in response to said computation;

receiving signal D, dividing a set point having a value of 1 by said signal D and delivering a signal E in response to said division;

measuring the flow rate of the recycled diluent stream and delivering a signal K in response to said measurement;

measuring the flow rate of the diluent stream and delivering a signal L responsive to said flow rate; and, adding signals K and L and delivering a signal M in response to said addition.

6. In a method for controlling a modifier stream of polymerization process wherein first and second monomer feed streams, a diluent stream, a recycled diluent stream, and the modifier stream are controllably passed into a temperature controlled reactor, a catalyst is controllably added to the diluent stream, a resultant product stream is removed from the reactor, and passed into a flash tank for the separation of a gas stream therefrom, the improvement comprising:

determining the ratio of modifier to total diluent in a gas stream separated from the product stream removed from the reactor, and, passing an amount of modifier stream into the reactor equal to the product of said ratio and the summation of the amount of said diluent stream and the amount of one of a stream chosen from among said recycled diluent stream and said second monomer feed stream.

* * * * *